US007393385B1

(12) United States Patent
Coffey et al.

(10) Patent No.: US 7,393,385 B1
(45) Date of Patent: Jul. 1, 2008

(54) APPARATUS AND METHOD FOR ELECTROSTATICALLY DEPOSITING AEROSOL PARTICLES

(75) Inventors: Calvin Thomas Coffey, Watkins Glen, NY (US); Curtis Robert Fekety, Tioga, PA (US); Andrey V Filippov, Painted Post, NY (US); Clinton Damon Osterhout, Beaver Dams, NY (US); Martin Andrew Sala, Campbell, NY (US); Carlton Maurice Truesdale, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/712,149

(22) Filed: Feb. 28, 2007

(51) Int. Cl.
*B03C 3/40* (2006.01)

(52) U.S. Cl. ........................ 95/59; 95/61; 95/78; 95/79; 96/62; 96/69; 96/77; 96/95; 96/98

(58) Field of Classification Search ..................... 96/60, 96/62, 69, 77–80, 88, 95–98; 95/59, 61, 95/78, 79
See application file for complete search history.

(56) References Cited

U.S. PATENT DOCUMENTS

| | | | | |
|---|---|---|---|---|
| 1,335,758 | A * | 4/1920 | Schmidt | 209/129 |
| 3,853,750 | A * | 12/1974 | Volsy | 209/127.1 |
| 4,038,049 | A * | 7/1977 | Melcher et al. | 95/62 |
| 4,239,505 | A * | 12/1980 | Drnevich | 95/78 |
| 4,251,234 | A * | 2/1981 | Chang | 95/78 |
| 4,892,579 | A | 1/1990 | Hazelton | 75/0.5 B |
| 5,041,145 | A * | 8/1991 | Kakinuma et al. | 96/52 |
| 5,288,305 | A * | 2/1994 | Gellert et al. | 95/57 |
| 5,348,571 | A * | 9/1994 | Weber | 96/68 |
| 5,391,220 | A * | 2/1995 | Patterson | 95/69 |
| 5,466,279 | A * | 11/1995 | Hattori et al. | 96/69 |
| 5,476,538 | A * | 12/1995 | Nishio et al. | 95/70 |
| 5,707,428 | A * | 1/1998 | Feldman et al. | 96/54 |
| 5,979,185 | A | 11/1999 | Blackwell et al. | 65/17.4 |
| 6,260,385 | B1 | 7/2001 | Sempolinski et al. | 65/17.4 |
| 6,312,507 | B1 * | 11/2001 | Taylor et al. | 96/19 |
| 6,487,879 | B1 | 12/2002 | Blackwell et al. | 65/414 |
| 6,508,982 | B1 * | 1/2003 | Shoji | 422/22 |
| 6,635,106 | B2 * | 10/2003 | Katou et al. | 96/67 |
| 6,878,930 | B1 | 4/2005 | Willoughby et al. | 250/281 |
| 6,923,979 | B2 | 8/2005 | Fotland et al. | 424/439 |
| 7,112,236 | B2 * | 9/2006 | Hoverson et al. | 95/78 |
| 2002/0085977 | A1 | 7/2002 | Fotland et al. | 424/45 |

(Continued)

FOREIGN PATENT DOCUMENTS

| | | | |
|---|---|---|---|
| JP | 53-128078 | * 11/1978 | 96/77 |

(Continued)

OTHER PUBLICATIONS

Corning Incorporated Application entitled "Apparatus For Particle Synthesis" filed Aug. 10, 2006.

(Continued)

*Primary Examiner*—Richard L Chiesa
(74) *Attorney, Agent, or Firm*—Tina N. Thompson

(57) ABSTRACT

An apparatus useful for electrostatic deposition (ESD) of aerosol particles and methods of depositing the aerosol particles onto a substrate are disclosed. The ESD apparatus and the method of the present invention are useful for electrostatically depositing nanoparticles produced by gas-phase synthesis onto a substrate where the velocity of the flow of aerosol can be controlled.

18 Claims, 3 Drawing Sheets

U.S. PATENT DOCUMENTS

| | | | | |
|---|---|---|---|---|
| 2003/0136153 | A1 | 7/2003 | Marley et al. | 65/144 |
| 2004/0187525 | A1 | 9/2004 | Coffey et al. | 65/390 |
| 2004/0206127 | A1 | 10/2004 | Coffey et al. | 65/390 |
| 2005/0100666 | A1 | 5/2005 | Hampden-Smith et al. | 427/212 |
| 2005/0120752 | A1 | 6/2005 | Brown et al. | 65/397 |
| 2005/0147752 | A1 | 7/2005 | Kodas et al. | 427/249.1 |
| 2005/0223899 | A1 * | 10/2005 | Kulmala et al. | 96/59 |

FOREIGN PATENT DOCUMENTS

| | | |
|---|---|---|
| WO | WO00/61282 | 10/2000 |
| WO | WO01/16376 | 3/2001 |

OTHER PUBLICATIONS

Corning Incorporated Application entitled "System and Method for Electrostatically Depositing particles", filed Feb. 28, 2007.

* cited by examiner

APPARATUS AND METHOD FOR ELECTROSTATICALLY DEPOSITING AEROSOL PARTICLES

BACKGROUND

1. Field of the Invention

The present invention relates generally to electrostatic deposition (ESD) of aerosol particles and more particularly to an apparatus useful for ESD and methods of depositing the aerosol particles onto a substrate.

2. Technical Background

Over the years, there has been rapid progress in the areas of electronics, materials science, and nanoscale technologies resulting in, for example, smaller devices in electronics, advances in fiber manufacturing and new applications in the biotechnology field. The ability to generate and collect increasingly smaller, cleaner and more uniform particles is necessary in order to foster technological advances in areas which utilize small particulate matter. The development of new, efficient and adaptable ways of producing small particulate matter and subsequently collecting or depositing the small particulate matter onto a substrate becomes more and more advantageous.

The size of a particle often affects the physical and chemical properties of the particle or compound comprising the particle. For example, optical, mechanical, biochemical and catalytic properties often change when a particle has cross-sectional dimensions smaller than 200 nanometers (nm). When particle sizes are reduced to smaller than 200 nm, these smaller particles of an element or a compound often display properties that are quite different from those of larger particles of the same element or compound. For example, a material that is catalytically inactive in the macroscale can behave as a very efficient catalyst when in the form of nanoparticles.

The aforementioned particle properties are important in many technology areas. For example, in optical fiber manufacturing, the generation of substantially pure silica and germanium soot particles from impure precursors in a particular size range (about 5-300 nm) has been key in providing optical preforms capable of producing high purity optical fiber. Also, in the field of pharmaceuticals, the generation of particles having certain predetermined properties is advantageous in order to optimize, for example, in vivo delivery, bioavailability, stability of the pharmaceutical and physiological compatibility. The optical, mechanical, biochemical and catalytic properties of particles are closely related to the size of the particles and the size of the compounds comprising the particles. Gas-phase methods of particle generation are attractive, since gas-phase methods typically yield large quantities of high purity particles which are within a desirable size range.

Particle generators such as aerosol reactors have been developed for gas-phase nanoparticle synthesis. Examples of these aerosol reactors include flame reactors, tubular furnace reactors, plasma reactors, and reactors using gas-condensation methods, laser ablation methods, and spray pyrolysis methods.

In particular, flame spray pyrolysis has proven adept for soot particle generation for silica preform production in optical fiber manufacturing, for example, those described in commonly owned U.S. Pat. Nos. 5,979,185 and 6,260,385, the disclosures of which are incorporated herein by reference in their entirety.

Hot wall tubular furnace reactors have also proven adept for soot particle generation for silica preform production in optical fiber manufacturing, for example, those described in commonly owned US Patent Application Publications 2004/0187525 and 2004/0206127, the disclosures of which are incorporated herein by reference in their entirety.

Induction particle generators are examples of hot wall tubular furnace reactors using inductive heating elements to heat the reactor walls. Examples of such induction particle generators are described in patent application Ser. No. 11/502,286, filed on Aug. 10, 2006, the disclosure of which is incorporated herein by reference in its entirety, may be used to produce a flow of aerosol containing aerosol particles dimensionally in the nanometer range.

Enhanced surface area is an enabling physical property for many applications, such as custom spotted microarrays, high display of surface area for catalysis, high display of luminescent elements and the like. Conventional methods of producing enhanced surface area, such as the method described in PCT Publication No. WO0116376A1, the disclosure of which is incorporated herein by reference in its entirety, ball milled Corning 1737™ glass particles of size range from 0.5 μm to 2 μm. These ball milled particles are sintered onto Corning 1737™ glass substrates. Deposits of nanoparticles provide optimum surface area. However, particles in this nanometer size range are difficult to produce and deposit onto a substrate.

One method of depositing aerosol particles onto a substrate currently being explored is electrostatic deposition (ESD) for various applications, for example, in electrostatic scrubbers for pollution abatement and in electro-painting. U.S. Pat. No. 4,892,579 for example, describes a process of preparing an amorphous metal alloy body from elemental metal powders by dispersing and mixing the elemental powders in the aerosol state, collecting them either electrostatically or using a cyclone and compaction using an isostatic hot-press. U.S. Pat. No. 6,923,979 describes a method for depositing particles in the micron range onto a dielectric substrate using an alternating electric field.

Another challenge of depositing aerosol particles onto a substrate is overcoming the velocity of the flow of the aerosol from the particle generator such that the electric field used in ESD can overcome the velocity of the flow of the aerosol and the aerosol particles are deposited onto the substrate.

It would be advantageous to have an apparatus and a method for electrostatically depositing nanoparticles produced by gas-phase synthesis onto a substrate where the velocity of the flow of aerosol can be controlled.

SUMMARY OF THE INVENTION

The apparatus for ESD and ESD methods of the present invention as described herein, address the above-mentioned disadvantages of the conventional ESD methods, in particular, the disadvantage of having too high a velocity of the aerosol flow to effectively use an electric field in the ESD apparatus to deposit the aerosol particles.

In one embodiment of the present invention, an apparatus for electrostatically depositing aerosol particles is disclosed. The apparatus comprises an inlet passage which is adapted to carry a flow of aerosol in the direction of a center axis of the inlet passage, a diverging section which is connected to the inlet passage and a particle deposition passage, wherein the particle deposition passage forms a turn relative to the center axis of the inlet passage.

The diverging section comprises an outlet passage which is capable of receiving a flow of aerosol from the inlet passage.

The particle deposition passage comprises a charging zone comprising a charger and is adapted to receive a flow of aerosol from the inlet passage and an electrostatic deposition zone adapted to receive a flow of aerosol from the charging zone. An outlet passage is positioned at the terminal end of the particle deposition passage and the electrostatic deposition zone comprises a pair of deposition electrodes spaced apart and facing one another.

In another embodiment of the present invention, a method for electrostatically depositing aerosol particles is disclosed. The method comprises: generating an initial flow of aerosol; passing the initial flow of aerosol across a diverging section that divides the initial flow of aerosol into a particle deposition stream and an outlet stream; wherein at least the particles in the particle deposition stream flow at an angle and at a reduced velocity relative to the initial flow of aerosol; passing the particle deposition stream through a charging zone comprising a charger; applying direct current to the charger to charge the aerosol particles passing there between, forming charged aerosol particles; passing the charged aerosol particles between a pair of deposition electrodes, at least one having a substrate attached thereto; and applying direct current to the deposition electrodes to produce an electric field there between that deposits the charged aerosol particles onto the substrate.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that both the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification. The drawings illustrate one or more embodiment(s) of the invention and together with the description serve to explain the principles and operation of the invention.

BRIEF DESCRIPTION OF THE DRAWINGS

The invention is described in the following detailed description and accompanying drawing figures.

DETAILED DESCRIPTION

Reference will now be made in detail to the various embodiments of the invention, examples of which are illustrated in the accompanying drawings. Wherever possible, the same reference numbers will be used throughout the drawings to refer to the same or like parts.

Figure 1:
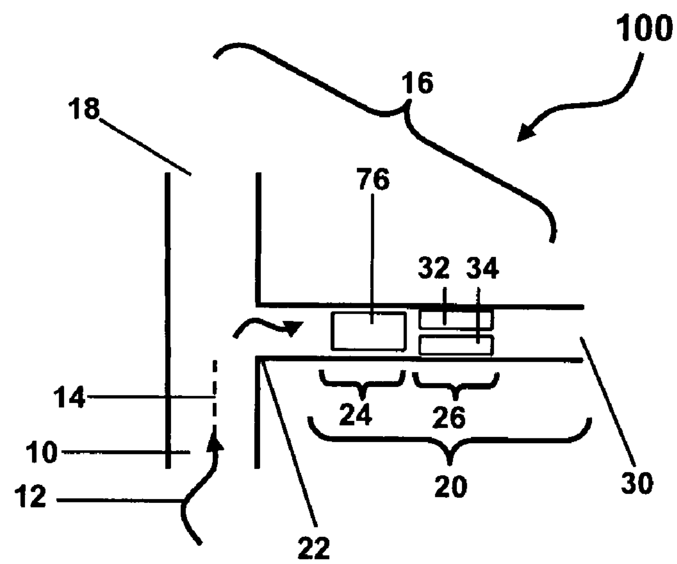
FIG. 1 is an illustration of an ESD apparatus in an embodiment according to the present invention.

An exemplary ESD apparatus 100 according to one embodiment of the present invention is shown in the illustration in FIG. 1. The ESD apparatus comprises an inlet passage 10 which is adapted to carry a flow of aerosol 12 in the direction of a center axis 14 of the inlet passage, a diverging section 16 which is connected to the inlet passage 10 and comprising a particle deposition passage 20, wherein the particle deposition passage forms a turn 22 relative to the center axis 14 of the inlet passage 10.

The diverging section 16 comprises an outlet passage 18 which is capable of receiving a flow of aerosol 12 from the inlet passage 10.

The particle deposition passage comprises a charging zone 24 comprising a charger 76 and which is adapted to receive a flow of aerosol 12 from the inlet passage 10 and an electrostatic deposition zone 26 adapted to receive a flow of aerosol from the charging zone 24. An outlet passage 30 is positioned at the terminal end of the particle deposition passage 20 and the electrostatic deposition zone 26 comprises a pair of deposition electrodes 32 and 34 spaced apart and facing one another.

Figure 2:
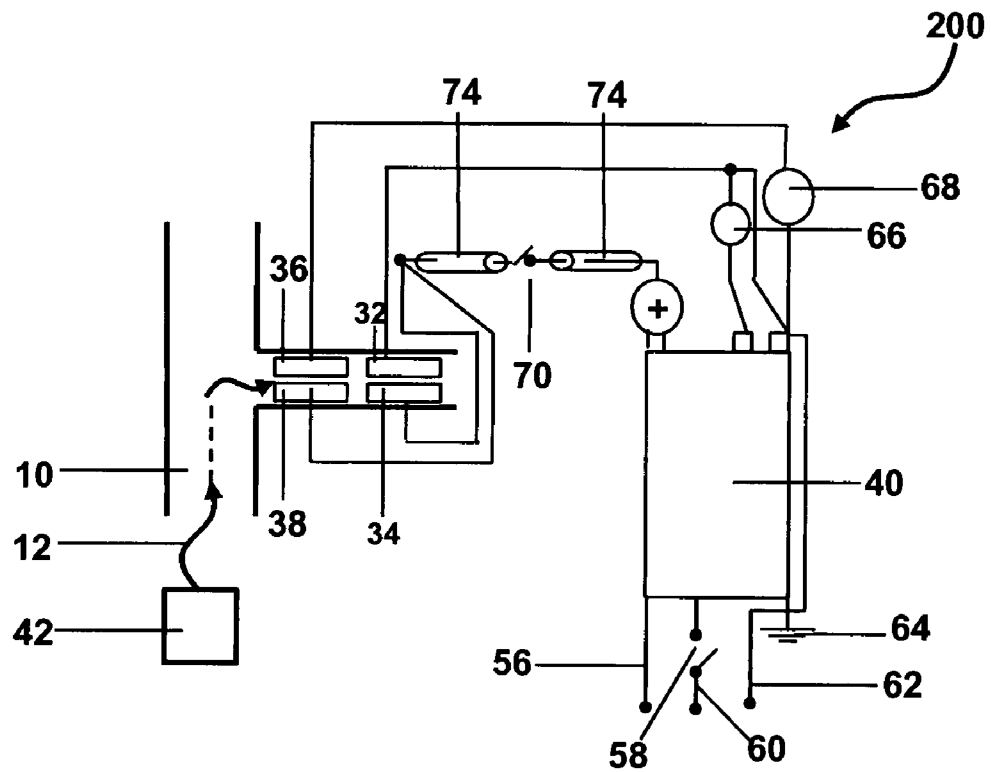
FIG. 2 is an illustration of the ESD apparatus according to one embodiment of the present invention.

An exemplary ESD apparatus 200 according to one embodiment of the present invention is shown in the illustration in FIG. 2. In this embodiment, the ESD apparatus comprises a particle generator 42 connected to the inlet passage 10 for generating a flow of aerosol 12 into the inlet passage. The particle generator, for example, is selected from an induction particle generator, a flame spray pyrolysis generator, an ultrasonic particle generator and combinations thereof.

Exemplary induction particle generators, for example, those described commonly owned US Patent Application Publications 2004/0187525, 2004/0206127 and U.S. patent application Ser. No. 11/502,286, may be used to produce a flow of aerosol 12.

Exemplary flame spray pyrolysis reactors, for example, those described in commonly owned U.S. Pat. Nos. 5,979,185 and 6,260,385, may also be used to produce a flow of aerosol 12.

A flow of aerosol 12 according to one embodiment can comprise carrier gases for the aerosol particles, for example, nitrogen, oxygen and the like or combinations thereof and precursors, reactants, particles and the like or combinations thereof.

Aerosol particles produced by gas-phase synthesis are typically charged positively or negatively during chemical reactions used to produce the aerosol particles. According to one embodiment of the present invention, any such charged aerosol particles are additionally charged by acquiring charge from airborne ions produced by a charger 76 shown in FIG. 1. According to another embodiment of the present invention, the charging zone 24 comprises a charger 76 selected from a corona charger, a radioactive gas ionizer, a photoelectric charger and combinations thereof.

The additional particle charging in the charging zone could be effectively accomplished by multiple charging mechanisms or a combination of several charging mechanisms. For example, the gas ions used for particle charging can be produced by a radioactive gas ionizer. The aerosol particles can be charged by irradiating aerosol by UV light or soft X-rays (photoelectric charging) produced by corresponding sources of electromagnetic radiation.

As shown in FIG. 2, the ESD apparatus 200 of the present invention may further comprise a variable power source of direct current (DC) 40 connected to the corona discharge electrodes 36 and 38 and the deposition electrodes 32 and 34.

The variable power source of direct current enables optimization of the deposition process parameters and should be capable, in one embodiment, of providing 0 to 75 thousand Volts Direct Current (kVDC). A voltmeter 66 and microammeter 68 are included to permit monitoring of voltage and current being supplied to the respective electrodes. High voltage coaxial cable 74 supplies the power to one of the pair of corona discharge electrodes 38 and one of the pair of deposition electrodes 34 which are positive in polarity in this embodiment. Relay 70 is included for safety of the operator of the ESD apparatus and is activated in conjunction with the variable power source of direct current ON-OFF switch 58, such as to ensure that electrodes 38 and 34 are totally discharged to ground 64 when the variable power source of direct current 40 is switched OFF. In the safety switch, location 60 is 'Live', location 56 is 'Neutral' and location 62 is 'Ground' for a 120 volt, 60 hertz current supply.

Figure 3:
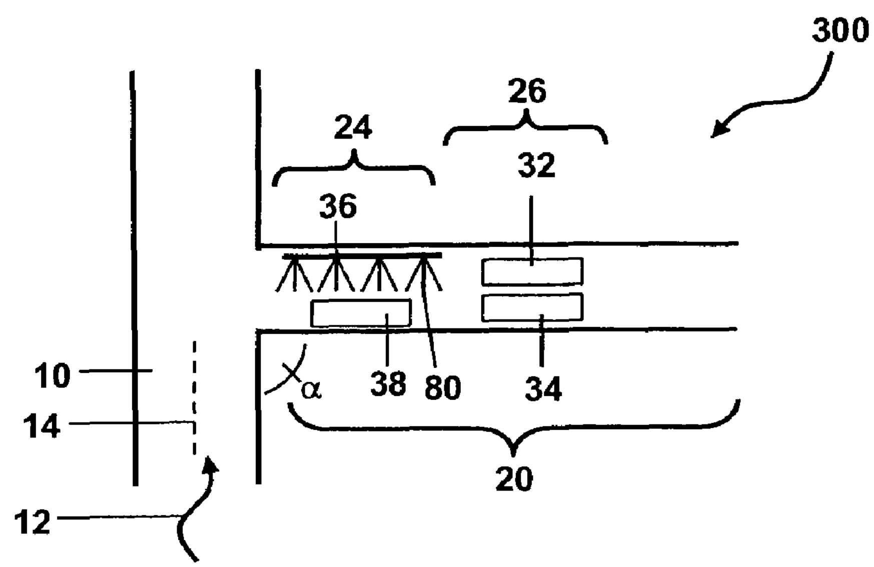
FIG. 3 is an illustration of features in an embodiment of the ESD apparatus according to the present invention.

Features 300 of an exemplary ESD apparatus according to one embodiment of the present invention is shown in the illustration in FIG. 3. For instance, when the charger comprises a corona charger, the corona charger comprises a pair of corona discharge electrodes 36 and 38 spaced apart and facing one another.

As shown in FIG. 3, the charging zone 24 comprises a pair of corona discharge electrodes 36 and 38 which are spaced apart and facing one another and adapted to receive a flow of aerosol 12 from the inlet passage 10 between the corona discharge electrodes. The electrostatic deposition zone 26 comprises a pair of deposition electrodes 32 and 34 spaced apart and facing one another. The electrostatic deposition zone is adapted to receive a flow of aerosol from the charging zone 24 between the deposition electrodes 32 and 34.

According to another embodiment of the present invention in the charging zone 24, one of the pair of corona discharge electrodes 36 comprise multiple corona wires 80 having an even delta profile. The efficiency of the charging is increased by increasing the delta area of the corona wires and by having multiple bundles of corona wires located in two or more parallel rows within corona discharge electrode 36.

As shown in FIG. 3, in one embodiment of the present invention, the diverging section comprises a particle deposition passage 20 at an angle $\alpha$ from 90 degrees to 170 degrees relative to the center axis 14 of the inlet passage 10.

In another embodiment of the present invention, the diverging section is sized and positioned relative to the center axis 14 by applying the following formula for particle drift velocity in the applied electric field:

$$V_{drift}=b_pE$$

wherein $V_{drift}$ is the velocity of the aerosol particles under the action of electric field, $b_p$ is the particle mobility coefficient and E is the vector of local electric field intensity between the deposition electrodes.

For efficient electrostatic deposition of nanoparticles onto the substrate in the deposition zone, the drift velocity of the nanoparticles in the inter-electrode space should be comparable to, or at least not much smaller than the flow velocity of carrier gas. The diverging section can thus be sized and positioned based upon the afore-mentioned parameters to optimize the deposition of nanoparticles onto a substrate.

Figure 4:
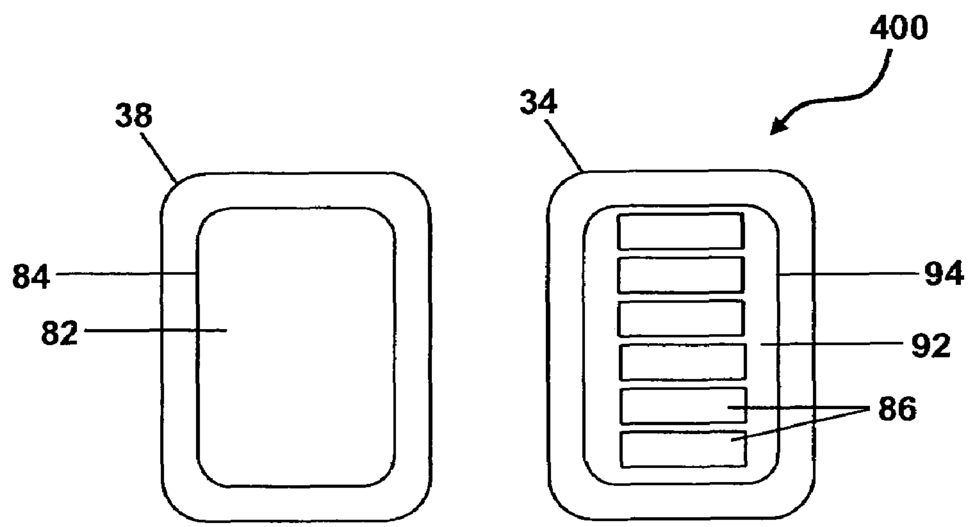
FIG. 4 is an illustration of the deposition electrodes according to one embodiment of the present invention.

In another embodiment of the present invention, as shown in FIG. 4, features 400 of at least one of the pair of corona discharge electrodes 38 and at least one of the pair of deposition electrodes 34 is illustrated. Corona discharge electrode 38 has an outer surface 82 which is a conductive material. Aluminum is a possible conductive material in the embodiment in FIG. 4. The conductive material could be, as an alternative, copper, brass, stainless steel, steel and combinations thereof.

Furthermore, the corona discharge electrode 38 in FIG. 4 is coated with a non-conductive material throughout the perimeter of the outer surface 84. High temperature silicon is a possible non-conductive material in the embodiment in FIG. 4. The non-conductive material could be, as an alternative, quartz, fused silica, ceramic, mica and combinations thereof. The corona discharge electrode 38 in FIG. 4 is rectangular in shape with rounded corners which further minimizes corona path leakage from the charging zone. Further the corners, edges, radii or unused surfaces of the corona discharge electrode 38 can be embedded in silicon.

The charged aerosol particle concentration that deposits on the substrates 86 in the embodiment shown in FIG. 4 can be controlled by the flow rate of the aerosol and the charging of the aerosol particles in the flow of aerosol. The charging can be controlled by using unipolar constant corona chargers.

If the charge is constant, the deposit can be made continuous. Typically, a corona charger has sharp corona electrodes (wires, needles etc.) producing ions in the air/carrier gas and smooth ion receiving electrodes, separated by an inter-electrode space, where a flow of aerosol flow is forwarded. The ions cross the flow and those colliding with the particles give up their charge, thus effectively charging. At high aerosol particle concentration, substantially all of the ions produced by the corona discharge are captured by the aerosol particles.

In the electrostatic deposition electrode of the embodiment shown in FIG. 4, at least one electrode 34 in the pair of deposition electrodes has an outer surface 92 comprising a conductive material. In the embodiment shown in FIG. 4, the conductive material could be aluminum, copper, brass, stainless steel, steel and combinations thereof.

In order to minimize corona path leakage from the charging zone when a corona charger is utilized, at least one electrode 34 in the pair of deposition electrodes shown in FIG. 4 is coated with a non-conductive material throughout the perimeter of the outer surface 94. In the embodiment shown in FIG. 4, the non-conductive material could be high temperature silicon, quartz, fused silica, ceramic, mica and combinations thereof. The deposition electrodes are rectangular in shape with rounded corners which further minimizes corona path leakage from the charging zone. Further the corners, edges, radii or unused surfaces of the deposition electrodes can be embedded in silicon.

The corona discharge electrodes shown in FIG. 1 and FIG. 3 are spaced from 2 inches to 10 inches apart from one another and can be positioned at any location within the deposition zone 20 and from 1 inch to 12 inches from the pair of deposition electrodes.

The deposition electrodes 32 and 34 shown in FIG. 3 are spaced from 2 inches to 8 inches apart from one another and are positioned from 1 inch to 12 inches from the pair of corona discharge electrodes.

The spacing of the corona discharge electrodes relative to each other and with respect to the deposition electrodes can be selected based upon the voltage being supplied to the apparatus. The spacing of the electrodes generally increases as the voltages increase. Typically, when spacing the electrodes, the electrodes are moved closer to each other until arcing between the electrodes is realized. At this point, the spacing of the electrodes is increased until the arcing ceases between the electrodes.

In FIG. 4, a substrate or several substrates 86 are positioned on at least one electrode in the pair of deposition electrodes. The substrates in one embodiment are Corning 1737™ glass slides which are deposited with the charged aerosol particles in the electrostatic deposition zone under the control of a direct current induced electric field.

Figure 5:
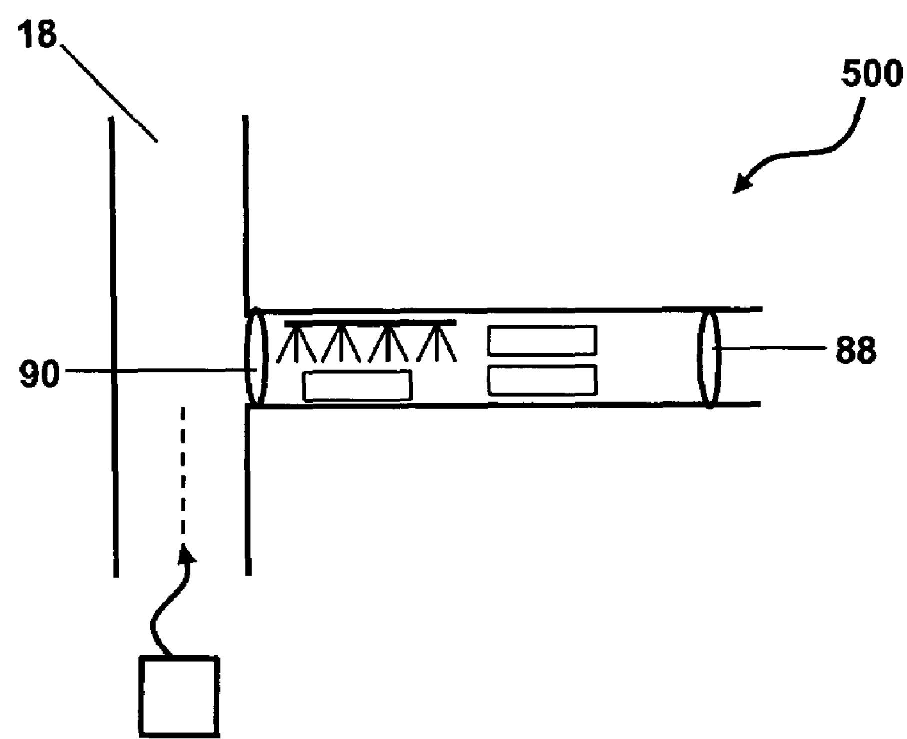
FIG. 5 is an illustration of additional features for controlling the flow of aerosol in the deposition zone in an embodiment of the ESD apparatus according to the present invention.

Additional features 500 for controlling the flow of aerosol in the deposition zone is shown in FIG. 5 according to another embodiment of the present invention. A damper 88 can be added to the ESD apparatus such that the flow of aerosol entering the diverging section can be reduced or increased by decreasing or increasing the volume of the open area of the outlet passage 18. Similarly, a damper 90 can be added to the ESD apparatus such that the flow of aerosol entering the diverging section can be reduced or increased by decreasing or increasing the volume of the open area of the outlet passage 18. The dampers 88 and 90 can function simultaneously to optimize the flow of aerosol entering the diverging section.

In another embodiment of the present invention, the damper 90 can function as an on/off switch for the flow of aerosol, such that, in the closed state, the substrates can be added or removed from the apparatus without the need to turn off the flow of aerosol from the particle generator.

In a further embodiment of the present invention, a method for electrostatically depositing aerosol particles is disclosed. The method comprises: generating an initial flow of aerosol; passing the initial flow of aerosol across a diverging section that divides the initial flow of aerosol into a particle deposition stream and an outlet stream; wherein at least the particles in the particle deposition stream flow at an angle and at a reduced velocity relative to the initial flow of aerosol; passing the particle deposition stream through a charging zone comprising a charger; applying direct current to the charging electrodes to charge the aerosol particles passing there between, forming charged aerosol particles; passing the charged aerosol particles between a pair of deposition electrodes, at least one having a substrate attached thereto; and applying direct current to the deposition electrodes to produce an electric field there between that deposits the charged aerosol particles onto the substrate.

In the method the charger can be selected from a corona charger, a radioactive gas ionizer, a photoelectric charger and combinations thereof. When the charger is a corona charger, the charger comprises a pair of corona discharge electrodes spaced apart and facing one another.

EXAMPLE

A flame spray pyrolysis (FSP) particle generator was used to generate a flow of aerosol, flammable alkoxide based solutions were pumped to an external mixing gas-assisted atomizer (Schlick Model 970/4-S3) by a 1 Liter capacity precision piston pump (Isco, Inc. Model 1000D). The resulting spray formed a self-sustaining flame when passed through a ring of twelve $CH_4/O_2$ pilot flames. The flow of aerosol carrying nanoparticles produced in the FSP particle generator passed through a corona discharge section (a set of corona brushes and an oppositely charged planar electrode) slightly above the flame for ionic electrostatic charging. Then, the flow of aerosol (carrier gas with charged particles) cooled down in the vertical part of the generator (about 1.2 meters above the burner face) and reached the deposition unit consisting of a central electrode and target substrates made of Corning 1737™ glass. A quartz tube with 0.14 m internal diameter and 1.5 meters in length covered all parts of the ESD apparatus, including the FSP particle generator, charging zone and the deposition zone. The diverging section housing the deposition passage allowed a reduced velocity of aerosol to be presented to the electrostatics without marginalizing the operation of the FSP particle generator, thereby, effectively collecting more nanoparticles onto the substrate at a higher density.

The FSP particle generator has been proven to produce a variety of inorganic nanopowders with controllable morphology. TEM photographs revealed a high degree of agglomeration in primary spherical nanoparticles. Most of these primary nanoparticles had diameters between 10 nm and 40 nm. In addition, the electrostatic deposition of the present invention was able to yield particle layers of increased density and desirable thicknesses (tens of microns) within seconds of the deposition time.

It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

What is claimed is:

1. An apparatus for electrostatically depositing aerosol particles comprising:

a particle generator selected from an induction particle generator, a flame spray pyrolysis generator, an ultrasonic particle generator and combinations thereof connected to an inlet passage adapted to carry a flow of aerosol in the direction of a center axis of the inlet passage;

a diverging section connected to the inlet passage, the diverging section comprising an outlet passage and a particle deposition passage, wherein the particle deposition passage forms a turn relative to the center axis of the inlet passage;

wherein the particle deposition passage comprises a charging zone comprising a charger and is adapted to receive a flow of aerosol from the inlet passage, an electrostatic deposition zone adapted to receive a flow of aerosol from the charging zone and an outlet passage positioned at the terminal end of the particle deposition passage; and the electrostatic deposition zone comprises a pair of deposition electrodes spaced apart and facing one another.

2. The apparatus according to claim 1, wherein the charging zone comprises a charger selected from a corona charger, a radioactive gas ionizer, a photoelectric charger and combinations thereof.

3. The apparatus according to claim 2, wherein the charger comprises a pair of corona discharge electrodes spaced apart and facing one another.

4. The apparatus according to claim 3, further comprising a source of direct current (DC) connected to the charging electrodes.

5. The apparatus according to claim 1, further comprising a source of direct current (DC) connected to the deposition electrodes.

6. The apparatus according the claim 1, wherein the particle deposition passage is at an angle ($\alpha$) from 90 degrees to 170 degrees relative to the center axis of the inlet passage.

7. The apparatus according to claim 3, wherein at least one of the pair of corona discharge electrodes comprises multiple corona wires having an even delta profile.

8. The apparatus according to claim 3, wherein at least one in the pair of corona discharge electrodes comprises an outer surface comprising a conductive material.

9. The apparatus according to claim 8, wherein the conductive material is selected from aluminum, copper, brass, stainless steel, steel and combinations thereof.

10. The apparatus according to claim 3, wherein the deposition electrodes are spaced from 2 inches to 8 inches apart from one another and are positioned from 1 inch to 12 inches from the pair of corona discharge electrodes.

11. The apparatus according to claim 1, wherein the electrodes in the pair of deposition electrodes each comprise an outer surface comprising a conductive material.

12. The apparatus according to claim 11, wherein the conductive material is selected from aluminum, copper, brass, stainless steel, steel and combinations thereof.

13. The apparatus according to claim 12, wherein at least one electrode in the pair of deposition electrodes further comprises a material selected from silicon, quartz, fused silica, ceramic, mica and combinations thereof located throughout the perimeter of the outer surface.

14. The apparatus according to claim 1, further comprising a substrate positioned on at least one electrode in the pair of deposition electrodes.

15. The apparatus according to claim 14, comprising two or more substrates positioned on at least one electrode in the pair of deposition electrodes.

16. A method for electrostatically depositing aerosol particles on a substrate, the method comprising:

generating an initial flow of aerosol comprising nanoparticles;

passing the initial flow of aerosol across a diverging section that divides the initial flow of aerosol into a particle deposition stream and an outlet stream; wherein at least the particles in the particle deposition stream flow at an angle and at a reduced velocity relative to the initial flow of aerosol;

passing the particle deposition stream through a charging zone comprising a charger;

applying direct current to the charger to charge the aerosol particles passing there between, forming charged aerosol particles;

passing the charged aerosol particles between a pair of deposition electrodes, at least one having a substrate attached thereto; and applying direct current to the deposition electrodes to produce an electric field there between that deposits the charged aerosol particles comprising nanoparticles onto the substrate.

17. The method according to claim 16, wherein the charger is selected from a corona charger, a radioactive gas ionizer, a photoelectric charger and combinations thereof.

18. The method according to claim 17, wherein the charger comprises a pair of corona discharge electrodes spaced apart and facing one another.

* * * * *